United States Patent
Padlia et al.

(10) Patent No.: US 7,203,359 B1
(45) Date of Patent: Apr. 10, 2007

(54) SPLIT SCREEN TECHNIQUE FOR IMPROVING BANDWIDTH UTILIZATION WHEN TRANSFERRING CHANGING IMAGES

(75) Inventors: Abhay Padlia, Bangalore (IN); Sachin Mishra, Varanasi (IN); Gurpreet Singh Sachdev, Ahmedabad (IN)

(73) Assignee: Novell, Inc., Provo, UT (US)

( * ) Notice: Subject to any disclaimer, the term of this patent is extended or adjusted under 35 U.S.C. 154(b) by 768 days.

(21) Appl. No.: 10/369,412

(22) Filed: Feb. 18, 2003

(51) Int. Cl.
*G06K 9/00* (2006.01)
*G06K 9/36* (2006.01)

(52) U.S. Cl. .................................................. 382/173
(58) Field of Classification Search ................ 382/164, 382/173, 176, 232, 239, 243, 284; 345/441, 345/619, 628, 629, 654, 670; 342/185; 709/208, 709/219; 715/500.1; 725/87, 135, 138
See application file for complete search history.

(56) References Cited

U.S. PATENT DOCUMENTS

| | | | |
|---|---|---|---|
| 4,611,202 A | 9/1986 | DiNitto et al. | |
| 4,872,001 A | 10/1989 | Netter | |
| 6,081,262 A * | 6/2000 | Gill et al. | 715/500.1 |
| 6,357,045 B1 * | 3/2002 | Devaney | 725/138 |
| 6,505,239 B1 * | 1/2003 | Kobata et al. | 709/208 |
| 6,633,905 B1 * | 10/2003 | Anderson et al. | 709/219 |
| 6,806,825 B2 * | 10/2004 | Andrusiak et al. | 342/185 |
| 2001/0052135 A1 * | 12/2001 | Balakrishnan et al. | 725/135 |
| 2002/0100052 A1 * | 7/2002 | Daniels | 725/87 |
| 2005/0002566 A1 * | 1/2005 | DiFederico et al. | 382/176 |

OTHER PUBLICATIONS www.mpeg.telecomitalialab.com.

* cited by examiner

*Primary Examiner*—Amir Alavi
(74) *Attorney, Agent, or Firm*—Haynes and Boone, LLP

(57) ABSTRACT

A method is provided for transferring digital image data. The method identifies areas of the image that frequently change and divides the image into regions based on the identified areas. The regions may be created based on a distance between identified areas, an amount of data encompassed by the identified areas, or other desired parameters. A unionizing process is applied to each of the regions to create a change rectangle encompassing the changes in each region. The information representing each change rectangle may then be transferred, resulting in a more efficient utilization of bandwidth.

12 Claims, 2 Drawing Sheets

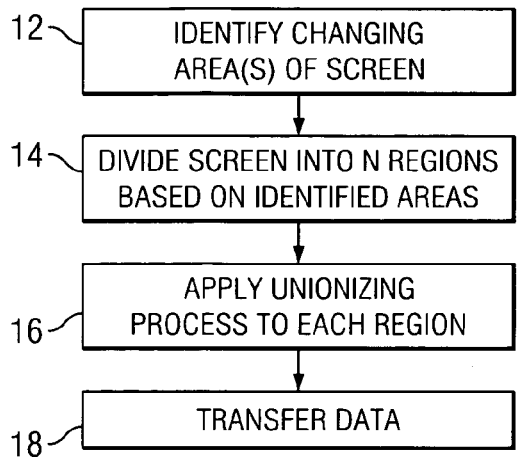
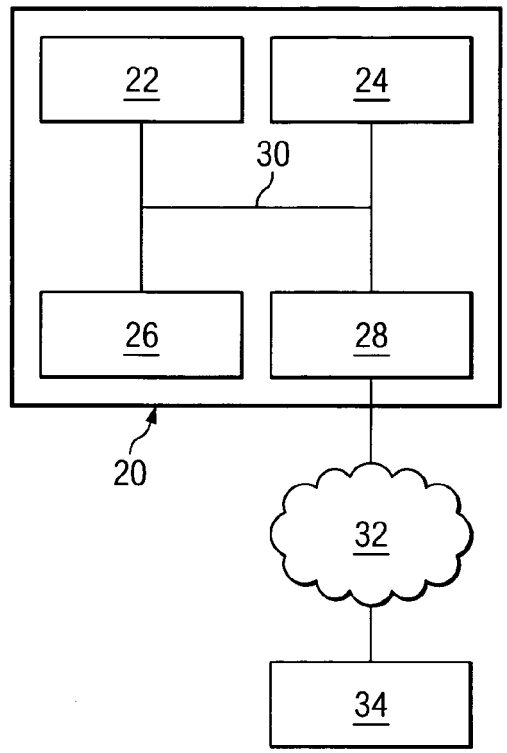
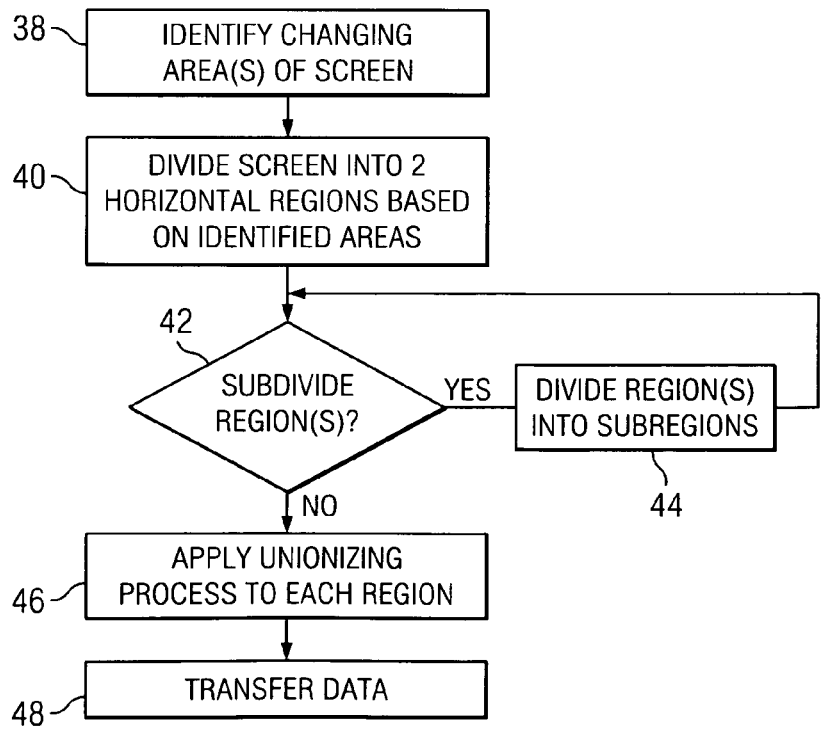

SPLIT SCREEN TECHNIQUE FOR IMPROVING BANDWIDTH UTILIZATION WHEN TRANSFERRING CHANGING IMAGES

BACKGROUND

This disclosure relates generally to bandwidth utilization and, more specifically, to a method for improving bandwidth utilization when transferring changing images.

In a computer network environment, one computer may be used to remotely control another computer. Such remote control provides advantages, but also presents difficulties. One of those difficulties is that remotely controlling a computer frequently requires that relatively large amounts of data be transferred between the controlling computer and the controlled computer. Furthermore, this data transfer often occurs on a fairly continuous basis. Because remote control operations occur in real time, it is generally important that the remote control session operates at a relatively high level of performance (e.g., changes on one computer are reflected quickly and accurately on the other computer).

A portion of the transferred data represents the screen of the controlled computer. The screen's contents may be captured as a series of images (e.g., screenshots) that reflect changes occurring on the screen over time. One approach to

SUMMARY

In response to these and other problems, a method is provided for minimizing an amount of image data to be transferred from a first digital device. In one embodiment, the method comprises identifying a first changing area of an image and dividing the image into first and second regions based on the first changing area, where the first region contains the first changing area. A unionizing process is applied to the first region, so that the amount of image data to be transferred is reduced.

In another embodiment, a method for reducing an amount of data representing a changing image that is to be transferred from a first digital device to a second digital device is disclosed. The method comprises applying a first parameter to an image. A plurality of regions are defined on the image by using the parameter to determine a relationship between two or more changing areas of the image. A unionizing process is applied to each of the plurality of regions within which the two changing areas are located. The unionizing process results in unionized data, which is transferred to the second digital device. Transferring the unionized data utilizes less bandwidth than transferring the image.

In still another embodiment, a computer readable medium comprises computer executable instructions for identifying a plurality of frequently changing pixels within an image. The image is divided into a plurality of image portions based on a relationship between the frequently changing pixels. A unionizing process is applied to each of the image portions containing a frequently changing pixel, so that changes occurring to the image may be represented using a reduced amount of data.

BRIEF DESCRIPTION OF THE FIGURES

FIG. 1 is a flowchart illustrating a method for identifying and transferring changes in digital image data.

FIG. 2 is a diagram of an exemplary computer and network that may be used to execute the method of FIG. 1.

FIG. 3 is a flowchart illustrating another embodiment of a method that may be executed on the computer of FIG. 2 for identifying and transferring changes in digital image data.

DETAILED DESCRIPTION

Figure 4:
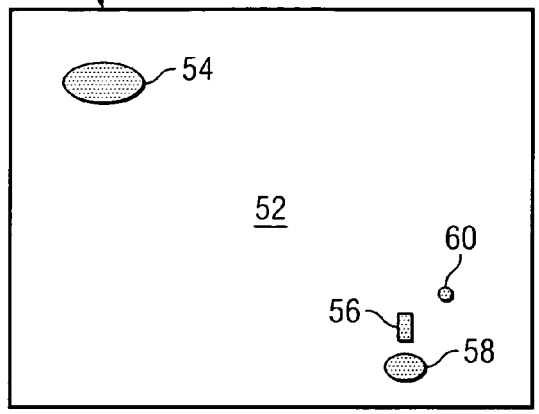
FIG. 4 is an illustration of a computer screen having changing information.

This disclosure relates generally to bandwidth utilization and, more specifically, to a method for improving bandwidth utilization when transferring changing images. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 10 is operable to identify changes occurring to an image on a digital device and transfer information regarding the image to a second digital device. For example, the image may be produced on a screen associated with the first device. In step 12, one or more areas of the screen where changes are occurring are identified. In step 14, the screen is divided into 'N' regions based on the changed areas. A unionizing process is then applied in step 16 to each of the N regions that contain a changing area to minimize the amount of data to be transferred to represent each region. In step 18, the unionized data is transferred to the second digital device, where it may be stored, reproduced, or manipulated as desired.

Referring now to FIG. 2, in another embodiment, an exemplary digital device 20, such as may be used to implement the method 10 of FIG. 1, is illustrated. In the present example, the digital device 20 is a computer, but it is understood that the digital device may be any device that uses digital image information. The computer 20 may include a central processing unit ("CPU") 22, a memory unit 24, an input/output ("I/O") device 26, and a network interface 28. The components 22, 24, 26, and 28 are interconnected by a bus system 30. It is understood that the computer may be differently configured and that each of the listed components may actually represent several different components. For example, the CPU 22 may actually represent a multi-processor or a distributed processing system; the memory unit 24 may include different levels of cache memory, main memory, hard disks, and remote storage locations; and the I/O device 26 may include monitors, keyboards, and the like.

The computer 20 may be connected to a network 32. The network 32 may be representative of several networks, such as a local area network, a company wide intranet, and/or the Internet. Because the computer 20 may be connected to the network 32, certain components may, at times, be shared with one or more other computers 34. Therefore, a wide range of flexibility is anticipated in the configuration of the computer. Furthermore, it is understood that, in some implementations, the computer 20 may act as a server to other computers 34.

Figure 5:
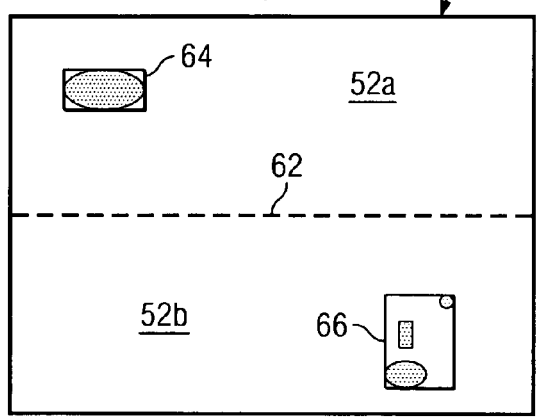
FIG. 5 is an illustration of dividing the computer screen of FIG. 4 into multiple regions during the execution of the method of FIG. 3.

Referring now to FIG. 3 and with additional reference to FIGS. 4 and 5, in another embodiment, a method 36 is operable to transfer changes in image data from a screen 50 of a first digital device (e.g., a computer monitor such as the I/O device 26 of FIG. 2) to the screen of a second digital device (e.g., the device 34 of FIG. 2). The screen 50 forms a single image 52, although it is understood that the image 52 may comprise a variety of different images or image components. The image 52 is formed by a plurality of pixels, where each pixel is represented by a predefined number of bits depending on a resolution of the screen 50. For example, if the screen 50 is set at 32-bit resolution, each pixel is represented by thirty-two bits. Furthermore, if the height and width of the screen is 1024×768 pixels, then the amount of information comprising the image 52 would be represented by 1024×768×32 bits.

In step 38 of FIG. 3 and referring also particularly to FIG. 4, four areas 54–60 of the image 52 are identified as changing over time. These areas need to be "refreshed" on the screen of the second digital device 34 if the device 34 is to accurately display the image 52.

Accordingly, in step 40 and as illustrated in FIG. 5, the image 52 is divided into 'N' regions based on these areas. In the present example, the value N is equal to two, and the image 52 is divided into two regions 52a and 52b by a line 62. It is understood that the line 62 is for purposes of illustration only, and that the regions 52a, 52b may be horizontal, vertical, or of different shapes and/or sizes. The basis for selecting the number of regions and their attributes is achieved by applying predefined criteria, such as a distance between the changing areas, an amount of data encompassed by each changing area, or by assigning a region to a predefined screen area, such as a taskbar. For example, two regions may be defined to encompass two areas that are identified based on a size of each area (e.g., the number of frequently changing pixels in a given space) and a distance between the two areas.

In step 42, a determination is made as to whether one or more of the regions created in step 40 should be subdivided into smaller regions. This may be desirable if, for example, a region contains two distinct changing areas that are relatively distant from each other within the region. It is understood that this subdivision process may be included in determining the initial regions in step 40. If it is determined that subdivisions are needed in one or more regions, the method 36 proceeds to step 44, where the regions are divided. The method 36 then returns to step 42 to determine if further subdivisions are needed. In the present example, no subdivisions are needed.

If it is determined in step 42 that subdivisions are not needed, the method 36 continues to step 46, where a unionizing process is applied separately to each of the regions 52a, 52b where changes are occurring. If no changes are occurring in a region during a given period, no unionizing process is required for that region. The unionizing process results in a single change rectangle being created for all the changes in each region 52a and 52b, which reduces the amount of information to be sent. For example, a change rectangle 64 is created to encompass the area 54 in the region 52a, while another change rectangle 66 is created to encompass the areas 56–60 in the region 52b. After the change rectangles are created, the data representing the change rectangles is transferred from the device 20 to the device 34 in step 48.

Figure 6:
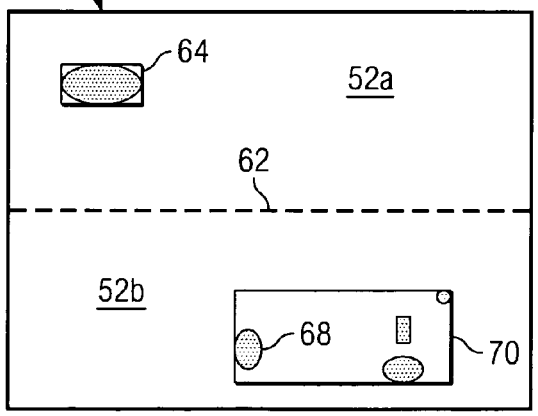
FIG. 6 is an illustration of the computer screen of FIG. 4 having additional changing information.
Figure 7:
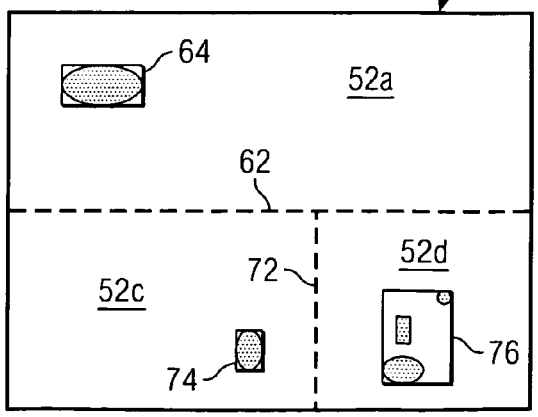
FIG. 7 is an illustration of subdividing a region on the computer screen of FIG. 6.

Referring still to FIG. 3 and with additional reference to FIGS. 6 and 7, in another embodiment, additional changes occur in an area 68 within the region 52b. For example, FIGS. 6 and 7 may represent the screen 50 of FIGS. 5 and 6 at a later time. As is illustrated in FIG. 6, if the unionizing process were to generate a single change rectangle 70 for the region 52b, the rectangle would include a relatively large amount of non-changing data.

Accordingly, as is illustrated in FIG. 7, to further optimize the amount of data that needs to be transferred, the region 52b may be subdivided by a line 72 into two smaller regions 52c and 52d in step 44 of FIG. 3. The unionizing process may then be applied to each area 52c, 52d to create a change rectangle 74 around the area 68 and another change rectangle 76 around the areas 56–60. This reduces the amount of data that needs to be transferred without requiring a separate change rectangle to be created for each changing area. It is understood that the size, shape, etc., of each region may be varied to optimize the transfer of data representing the image.

While the preceding description shows and describes one or more embodiments, it will be understood by those skilled in the art that various changes in form and detail may be made therein without departing from the spirit and scope of the present disclosure. For example, the present disclosure may be applied to a web page, where multiple portions of the web page are frequently changing. By dividing the web page into regions based on the changing portions, the amount of data that must be refreshed in a browser used to view the web page is minimized because non-changing regions are not refreshed each time. It is also understood that the present disclosure may be combined with other optimization and transfer techniques, such as those disclosed in U.S. patent application Ser. No. 10/337,460, filed on Jan. 6, 2003, and entitled "METHOD AND SYSTEM FOR TRANSFERRING REPETITIVE IMAGES OVER COMPUTER NETWORKS," which is hereby incorporated by reference as if reproduced in its entirety. Therefore, the claims should be interpreted in a broad manner, consistent with the present disclosure.

What is claimed is:

1. A computer readable medium comprising computer executable instructions for:
   identifying a plurality of frequently changing pixels within an image;
   dividing the image into a plurality of image portions based on a relationship between the frequently changing pixels;
   verifying that each of the image portions includes at least one frequently changing pixel; and
   applying a unionizing process to each of the image portions containing a frequently changing pixel, wherein changes occurring to the image may be represented using a reduced amount of data.

2. The computer readable medium of claim 1 further comprising instructions for identifying the relationship, wherein the relationship includes a distance between at least two frequently changing pixels.

3. The computer readable medium of claim 1 further comprising instructions for categorizing the frequently changing pixels into one or more pixel groups, wherein a relationship between the pixel groups is used in dividing the image into the plurality of image portions.

4. The computer readable medium of claim 1 further comprising instructions for transferring the reduced amount of data from a first digital device containing the image to a second digital device.

5. A method for minimizing an amount of image data to be transferred from a first digital device, the method comprising:
- identifying a plurality of frequently changing pixels within an image;
- dividing the image into a plurality of image portions based on a relationship between the frequently changing pixels;
- verifying that each of the image portions includes at least one frequently changing pixel; and
- applying a unionizing process to each of the image portions containing a frequently changing pixel, wherein changes occurring to the image may be represented using a reduced amount of data.

6. The method of claim 5 further comprising identifying the relationship, wherein the relationship includes a distance between at least two frequently changing pixels.

7. The method of claim 5 further comprising categorizing the frequently changing pixels into one or more pixel groups, wherein a relationship between the pixel groups is used in dividing the image into the plurality of image portions.

8. The method of claim 5 further comprising transferring the reduced amount of data from a first digital device containing the image to a second digital device.

9. Apparatus for minimizing an amount of image data to be transferred from a first digital device, the apparatus comprising:
- means for identifying a plurality of frequently changing pixels within an image;
- means for dividing the image into a plurality of image portions based on a relationship between the frequently changing pixels;
- means for verifying that each of the image portions includes at least one frequently changing pixel; and
- means for applying a unionizing process to each of the image portions containing a frequently changing pixel, wherein changes occurring to the image may be represented using a reduced amount of data.

10. The apparatus of claim 9 further comprising means for identifying the relationship, wherein the relationship includes a distance between at least two frequently changing pixels.

11. The apparatus of claim 9 further comprising means for categorizing the frequently changing pixels into one or more pixel groups, wherein a relationship between the pixel groups is used in dividing the image into the plurality of image portions.

12. The apparatus of claim 9 further comprising means for transferring the reduced amount of data from a first digital device containing the image to a second digital device.

* * * * *

UNITED STATES PATENT AND TRADEMARK OFFICE
CERTIFICATE OF CORRECTION

PATENT NO.         : 7,203,359 B1
APPLICATION NO. : 10/369412
DATED                  : April 10, 2007
INVENTOR(S)       : Abhay Padlia, Sachin Mishra and Gurpreet Singh Sachdev It is certified that error appears in the above-identified patent and that said Letters Patent is hereby corrected as shown below:

Insert missing Page 2 of the originally filed application which contained the following paragraphs:

--improving performance is to reduce the amount of data that needs to be transferred to represent each screenshot. Such an approach may have particular applicability when the network bandwidth is a constraint, such as in a wide area network (WAN) or slow-link environment.
[0004] One method for reducing the screenshot data is to send only delta changes (e.g., changes with respect to the data that was previously transferred) from the controlled desktop. Delta changes may be determined by a unionizing process. For example, there may be changes occurring in many different regions of the screen. The changes in each region may be bounded by a changed rectangle. If all changed screen rectangles are considered separately and memory dump calls are made for each of them, there is a large increase in overhead. This causes performance degradation in terms of a higher central processing unit (CPU) utilization and slower response times on the controlled machine. Accordingly, the unionizing process is used to combine the changed rectangles into one single changed rectangle and a memory dump of this single changed rectangle is taken. This aids in improving performance.
[0005] However, if there are only minor changes that occur in distant parts of the screen (relative to other changes), then the unionizing process may result in inefficiencies. For example, if changes occur in two small areas that are distant from each other, and the two areas are combined into a single rectangle, the changed rectangle becomes large relative to the changed areas. Sending the data for this large rectangle results in high bandwidth utilization. Furthermore, operations like switching from one application to another or invoking "Start" while another application is active can cause large amounts of data to be sent because of the unionizing algorithm.

UNITED STATES PATENT AND TRADEMARK OFFICE
CERTIFICATE OF CORRECTION

PATENT NO. : 7,203,359 B1
APPLICATION NO. : 10/369412
DATED : April 10, 2007
INVENTOR(S) : Abhay Padlia, Sachin Mishra and Gurpreet Singh Sachdev It is certified that error appears in the above-identified patent and that said Letters Patent is hereby corrected as shown below:

Insert missing Page 2 of the originally filed application which contained the following paragraphs (cont'd):

[0006] Therefore, what is needed is an improved method and system for identifying and transmitting image information in a network environment. For example, it is desirable to identify information regarding changes that occur on a digital display screen of one device and efficiently transfer the information to another device. --

Signed and Sealed this

Nineteenth Day of June, 2007

JON W. DUDAS
*Director of the United States Patent and Trademark Office*